Feb. 4, 1969  G. H. LEARY  3,425,652
VIBRATION CONTROLLING MOUNTING APPARATUS
Filed April 12, 1967
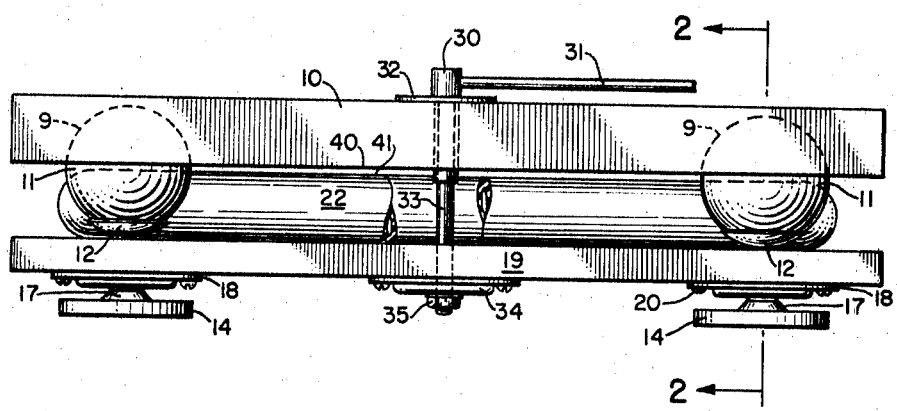
FIG. 1.
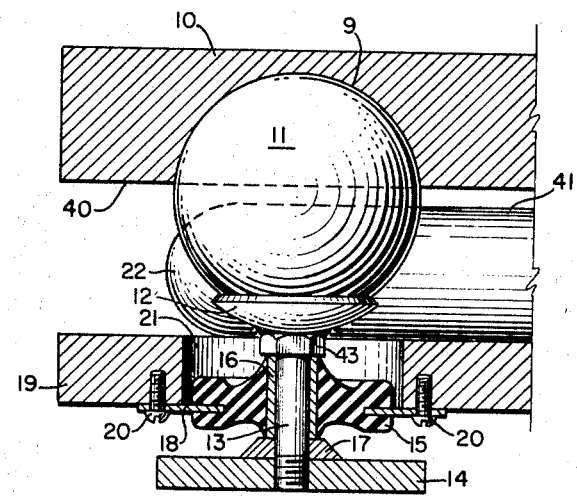
FIG. 2.
INVENTOR.
GORDON H. LEARY
BY 
ATTORNEY

United States Patent Office 3,425,652
Patented Feb. 4, 1969

3,425,652
VIBRATION CONTROLLING MOUNTING APPARATUS
Gordon H. Leary, 3255 Fritchie Drive,
Baton Rouge, La. 70809
Filed Apr. 12, 1967, Ser. No. 630,352
U.S. Cl. 248—22
Int. Cl. F16f 15/08
14 Claims

ABSTRACT OF THE DISCLOSURE

This invention relates to a vibration damping apparatus for supporting instruments in a vibration free manner and more particularly this invention relates to a vibration damping apparatus for supporting instruments wherein external vibrations of one or more frequencies may be tuned out so that the supported instrument may be operated in a vibration free condition.

BACKGROUND OF THE INVENTION

It is well known that delicate instruments such as chemical balances, potentiometers and other such instruments perform most successfully when mounted in a vibration free condition. Many efforts have been made to provide vibration free mounting bases for these instruments such as use of heavy marble tables and sponge rubber or like compressible materials under the legs of the base and in many cases such mounting bases are completely successful.

In many other applications, however, an instrument such as a chemical balance may be used within an area adjacent to operating commercial equipment or laboratory equipment which provides vibrations of varying frequencies. Chemical balances may be located and used in laboratories adjacent to compressors, pumps, stirring or mixing devices and other apparatus all or part of which may be operating at the same time, and during operation of this apparatus it is necessary to use the chemical balance. In cases such as this, many times the heavy mounting base or vibration absorbing means such as sponge under the balance legs will not remove the vibrations of the surrounding apparatus and as a result, the chemical balance will not operate successfully. The vibrations from the surrounding apparatus are transmitted through the table and the absorbing device to the legs and cause the balance arm to vibrate so that a proper reading cannot be obtained.

This condition becomes especially severe with the use of the more modern weighing apparatus where the movement of the balance arm is magnified 10 to 1000 times to permit more accurate weighing of samples as will be readily understood by those skilled in the art. If the movement of the balance arm itself is magnified 10 to 1000 times for accurate reading, it is obvious also that external vibrations which are transmitted to the balance will be magnified proportionately and will in many cases cloud the movement of the balance arm completely in the weighing operation.

Accordingly, it is clear that an apparatus and means of removing many different external vibrations at the same time from a supporting base for a delicate instrument is a worthwhile advance in the art.

SUMMARY OF THE INVENTION

In accordance with this invention there is provided an apparatus for adjustably tuning out vibrations from external sources.

The apparatus comprises a mounting base separated from the apparatus support by a first vibration damping means, and an underbase, below and substantially parallel to the mounting base, which is adjustably connected to the mounting base through a second vibration damping means. Additionally, a third vibration damping means may be provided between the mounting base and underbase so that when the distance between the underbase and the mounting base is reduced sufficiently by the adjustable connection between the two, the third vibration damping means will contact both the mounting base and the underbase.

Within the scope of the invention is the apparatus described above wherein the first, second and third vibration damping means are made at least in part from an elastomeric material.

Also within the scope of the invention is the apparatus described above wherein the first vibration damping means are spherical.

Included in the invention is the apparatus described above wherein the second vibration damping means are capable of damping vibration substantially only in a horizontal direction.

Also included in the invention is the apparatus described above wherein the third vibration means is a hollow tube of elastomeric material.

A more specific description of the invention is the apparatus described above wherein the support means has a leveling means for adjustably levelling the substantially horizontal mounting base.

Another specific description of the invention is the apparatus described above wherein the support means has means for restricting the vertical movement of the second vibration means on the support means.

An even more specific description of the invention is the apparatus described above wherein the first vibration damping means are substantially spherical and constructed at least in part from an elastomeric material having compressive deflection of from about 1/64 to about 1/2 of an inch per pound of static load.

A still further specific description of the invention includes the apparatus described above wherein the second vibration damping means are at least in part elastomeric and have from about 1/32 to about 1/8 of an inch vertical deflection at a static load of from about 3 to about 45 pounds.

Another still further specific description of the invention includes the apparatus described above wherein the third vibration damping means is constructed from an elastomeric material and has a compressive deflection of from about 1/64 to about 1/16 of an inch per pound of static load.

BRIEF DESCRIPTION OF THE DRAWING

In the drawing, FIG. 1 is a horizontal view, partially in cross section, of an apparatus embodying the invention.

FIG. 2 is a cross sectional view in enlarged scale of a portion of the apparatus of FIG. 1 taken at section 2—2 thereof.

DESCRIPTION OF A PREFERRED EMBODIMENT

Figure 3:
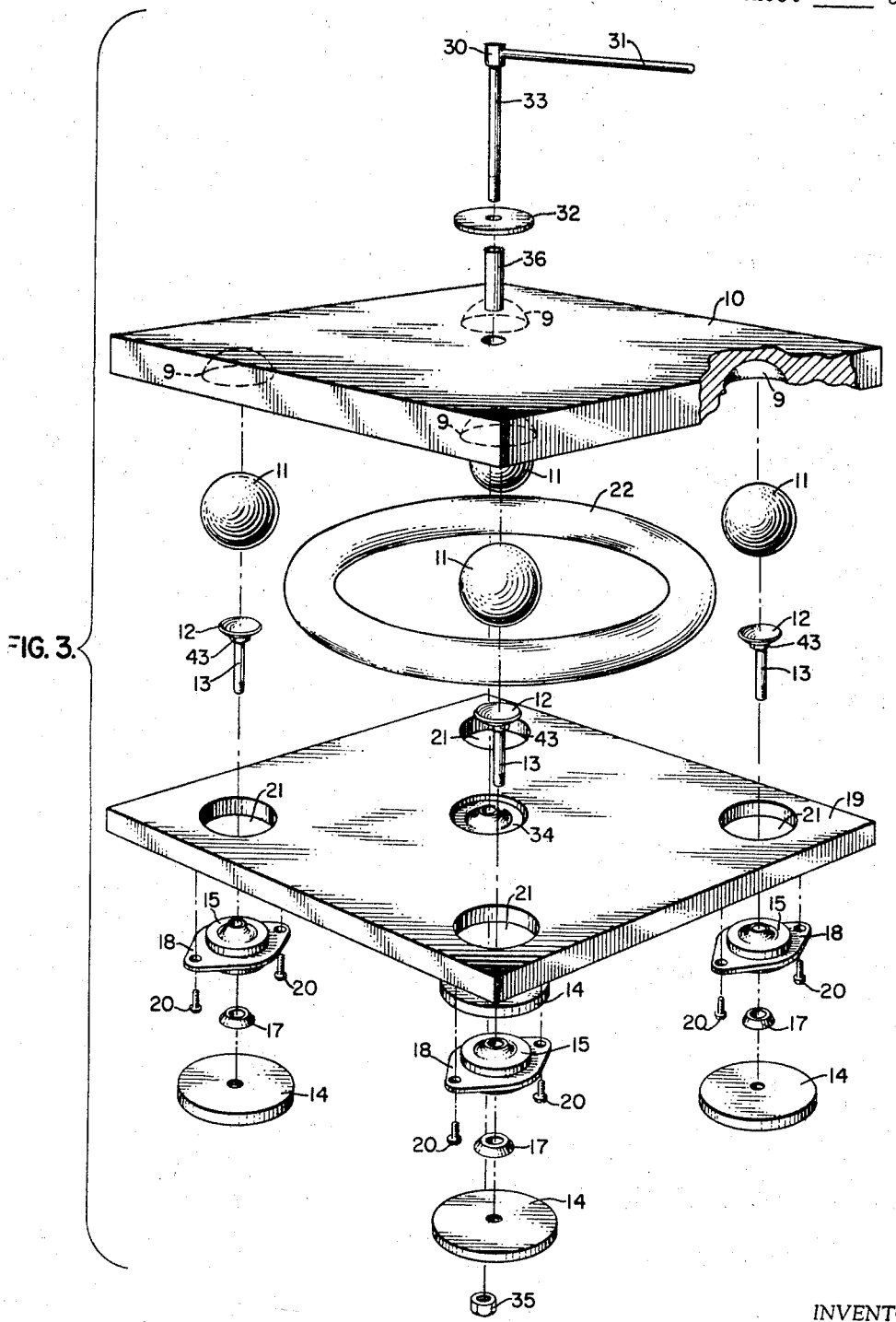
FIG. 3 is a three dimensional view of the apparatus of FIG. 1 with the parts thereof expanded vertically.

Referring now to FIGS. 1, 2 and 3, substantially horizontal mounting base 10 locates and is supported by a first vibration damping means 11 which rests on and is supported by cup 12 mounted on shaft 13. Affixed to the lower end of shaft 13 is foot 14 which supports and carries the entire apparatus. Foot 14 may be affixed to shaft 13 in any suitable manner such as threads as shown, or other means clear to those skilled in the art, to provide minor adjustment for levelling the apparatus.

Surrounding shaft 13 is second vibration damping means 15 which has insert 16 to permit the free vertical movement of second vibration damping means 15 on shaft 13. Suitable base 17 may be provided on top of foot 14 and around shaft 13 to restrict the vertical movement of second vibration damping means 15 if desired.

Attached to and located around second vibration damping means 15 is mounting means 18 for fixedly attaching second vibration absorbing means 15 to underbase 19 by screw means 20 or any other suitable means. When mounting means 18 is attached to underbase 19, second vibration mounting means may be located at least partially within underbase 19 and not in contact therewith as provided by cutout 21.

Located on underbase 19 is third vibration absorbing means 22 which is constructed and arranged in a shape and size so as not to contact other parts of the apparatus but to contact only underbase 19 when adjustnig means 30 is in an open condition. Adjusting means 30, located on substantially horizontal base 10, has handle 31 and is supported on base 10 by disc 32. Adjusting means shaft 33 passes through horizontal base 10 and underbase 19 and is connected with a vibration absorbing means 34 which may be the same or different from second vibration damping means 15 with its attachment parts 18 and 20 or, if desired, no vibration damping means may be provided and shaft 33 may be attached directly to underbase 19 by a vertical adjusting means such as nut 35 as shown in the embodiment of FIG. 1 attached to vibration damping means 34. Sleeve 36 may be provided in base 10 to surround shaft 33 if desired to permit a free rotation of shaft 33 by handle 31.

In the embodiment of the apparatus shown in the drawing, first vibration absorbing means 11 is located in base 10 by means of a spherical cutout 9; however, it is clear that any suitable means may be provided in base 10 for locating the vibration absorbing means on the underside of base 10 as may be desired.

In operation, the apparatus of this invention may be placed upon any suitable table or heavy mounting base as desired with adjusting means 30 in its open position so that there is no contact between the lower surface 40 of horizontal base 10 and the upper surface 41 of third vibration means 22. In this condition, an apparatus or weighing balance supported by base 10 is insulated from vibrations transmitted to mounting foot 14 by first vibration absorbing means 11 as assisted by the vibration counter-balance effect of underbase 19 which is supported by adjusting means 30 and is free to move up and down in a vertical direction around foot shaft 13 and is restricted in movement in a horizontal direction by vibration means 15.

Should it be found that the apparatus or chemical balance mounted on base 10 still vibrates under this condition of mounting then adjusting means 30 is rotated in a proper direction to bring the top of sleeve 16 lying within second vibration means 15 in contact with the underside or base portion 43 of cup 12. Operation in this fashion tends to add compressive force by the second vibration means 15 on the first vibration absorbing means 11, thereby changing the vibration absorbing characteristics of the first and second vibration means, and causes vibration means 15 to be functional in both the vertical and horizontal directions which changes the vibration counterbalance effect on underbase 19.

Should an apparatus located on base 10 continue to have external vibrations transmitted thereto from surrounding apparatus or conditions, then the distance between underbase 19 and substantially horizontal mounting base 10 may be reduced further by gradual rotation of adjusting means 30 by arm 31 and with each minor change in adjustment means 30, the loadings on both the first and second vibration absorbing means are changed causing a change in the vibration absorbing characteristics of the apparatus. As can be seen clearly, by continuing the adjustment of adjustment means 30, the vibration absorption characteristics of both first vibration means 11 and second vibration means 15 are changed incrementally so that external vibrations of varying and random frequencies may be tuned out effectively.

Should the apparatus or chemical balance located upon base 10 continue to vibrate after partial adjustment of adjustment means 30 to reduce the vertical distance between horizontal base 10 and underbase 19, then after sufficient reduction of the distance therebetween takes place, third vibration means located between horizontal base and underbase 19 will come in contact with the underside of horizontal base 10 to provide at least a third means of vibration removal and a horizontal and vertical damping effect on the two mounting bases. It can be seen that by proper adjustment of the apparatus and proper selection of each of the three vibration absorbing means, external vibrations of many varied and multiple frequencies may be tuned out effectively and a balance or other sensitive apparatus placed upon the apparatus of this invention may be operated or used in an essentially vibration-free condition.

Each of the at least three vibration absorbing means or damping means may be constructed in any shape and from any material capable of having vibration absorption characteristics, and in accordance with this invention, it is preferred that at least a part of each of the vibration absorption means be constructed from an elastomeric material such as rubber or plastic. In a preferred embodiment of the invention shown in the drawing, it is preferred that the first vibration absorption means be spherical and that it be constructed from an elastomeric material. It is clear, however, that the first vibration damping means may be of any shape, such as a cylinder, a rectangle, a square or other, and suitable means may be provided for the attachment of the vibration damping means between the support means and the substantially horizontal plate. In a preferred embodiment of the invention, the first vibration damping means is constructed from any elastomeric material, either in whole or in part, in a shape or configuration such that the first vibration damping means will have a compressive deflection of from about $1/64$ of an inch to about $1/2$ of an inch per pound of static load applied to each individual vibration absorption means.

As shown in the preferred embodiment described in the drawing, second vibration damping means is constructed at least in part from elastomeric material; however, it is clear that second vibration damping means may be constructed from all elastomeric material and in any shape or configuration desired. It is also clear that second vibration damping means may be constructed and arranged to absorb vibration in either a horizontal or vertical direction or both, and in the preferred embodiment of the drawing, second vibration damping means is constructed and arranged to absorb vibration primarily in a substantially horizontal direction. When second vibration damping means is constructed and arranged at least in part from an elastomeric material and designed to absorb vibration primarily in a horizontal direction, it is preferred that each second vibration damping means has a vertical deflection of from about $1/32$ of an inch to about $1/8$ of an inch at a static load of from about 3 to about 45 pounds.

Third vibration damping means may be constructed all or in part from elastomeric material and in any shape and any dimensions necessary to provide a vibration absorbing means not in contact with the substantial horizontal base and underbase in open adjustment and in contact with the two bases in closed adjustment. Third vibration damping means may be solid or hollow and in a preferred embodiment, third vibration damping means is a hollow tubular elastomeric material having compressive deflection of from about $1/64$ to about $1/16$ of an inch per pound of static load applied.

As taught previously, the adjusting means for changing the vertical distance between the substantially horizontal base and the underbase may be connected with a vibration absorbing means located in one of the bases or may be connected directly to a base without connection through a vibration absorption means. In the preferred embodiment of the drawing, the adjusting means is connected to a vibration absorbing means attached to the underbase and the vibration absorbing means is the same as the second vibration absorbing means described above. It is clear, however, that when a vibration absorption means is used in operable connection with the adjusting means, it may be the same or different than second vibration damping means.

What is claimed is:

1. An apparatus for adjustably tuning out vibrations from external sources comprising, in combination,
    (a) a substantially horizontal mounting base, at least a first, second and third vibration damping means, an underbase, an adjusting means, and a support means;
    (b) said substantially horizontal mounting base having means for receiving, locating and being supported by the first vibration damping means;
    (c) said underbase being located below and substantially parallel to said substantially horizontal mounting base and having the second vibration damping means affixed thereto;
    (d) said support means supporting said first vibration damping means and being surrounded by at least a part of said second vibration damping means for vertical movement thereon;
    (e) said adjusting means being located on and passing through said substantially horizontal mounting base and adjustably connected to said underbase to change the distance between said substantially horizontal mounting base and said underbase when said adjusting means is rotated in a horizontal direction;
    (f) the third vibration damping means being located between said substantially horizontal mounting base and said underbase and being of sufficient thickness so that when the distance between said substantially horizontal mounting base and said underbase is reduced said third vibration damping means contacts said substantially horizontal mounting base and said underbase.

2. The apparatus of claim 1 further characterized by said first, second and third vibration damping means being made at least in part from an elastomeric material.

3. The apparatus of claim 1 further characterized by said first vibration damping means being spherical.

4. The apparatus of claim 1 further characterized by said second vibration damping means being capable of damping vibration substantially only in a horizontal direction.

5. The apparatus of claim 1 further characterized by said third vibration damping means being a hollow tube of elastomeric material.

6. The apparatus of claim 1 further characterized by said support means having levelling means for adjustably levelling said substantially horizontal mounting base.

7. The apparatus of claim 1 further characterized by said support means having means for restricting the vertical movement of said second vibration damping means on said support means.

8. The apparatus of claim 1 further characterized by said first vibration damping means being substantially spherical and constructed at least in part from an elastomeric material having compressive deflection of from about $1/64$ to about $1/2$ of an inch per pound of static load.

9. The apparatus of claim 1 further characterized by said second vibration damping means being at least in part elastomeric and having from about $1/32$ to about $1/8$ of an inch vertical deflection at a static load of from about 3 to about 45 pounds.

10. The apparatus of claim 1 further characterized by said third vibration damping means being constructed from an elastomeric material and having a compressive deflection of from about $1/64$ to about $1/16$ of an inch per pound of static load.

11. An apparatus for adjustably tuning out vibrations from external sources comprising, in combination,
    (a) a substantially horizontal mounting base, at least a first and a second vibration damping means, an underbase, an adjusting means, and a support means;
    (b) said substantially horizontal mounting base having means for receiving, locating and being supported by the first vibration damping means;
    (c) said underbase being located below and substantially parallel to said substantially horizontal mounting base and having the second vibration damping means affixed thereto;
    (d) said support means supporting said first vibration damping means and being surrounded by at least a part of said second vibration damping means for vertical movement thereon;
    (e) said adjusting means being located on and passing through said substantially horizontal mounting base and adjustably connected to said underbase, said adjusting means being constructed and arranged to change the distance between said substantially horizontal mounting base and said underbase.

12. The apparatus of claim 11 further characterized by having a third vibration damping means located between said substantially horizontal mounting base and said underbase and being of sufficient thickness to contact said substantially horizontal mounting base and said underbase when the distance between the two is reduced substantially by said adjusting means.

13. The apparatus of claim 12 further characterized by said third vibration damping means being a hollow tube of elastomeric material.

14. The apparatus of claim 12 further characterized by said third vibration damping means being constructed from an elastomeric material and having a compressive deflection of from about $1/64$ to about $1/16$ of an inch per pound of static load.

References Cited

UNITED STATES PATENTS

| | | | |
|---|---|---|---|
| 2,474,921 | 7/1949 | Tarley et al. | 248—358 |
| 2,660,387 | 11/1953 | Roy | 248—21 |
| 3,212,745 | 10/1965 | Lode | 248—358 |
| 3,323,764 | 6/1967 | Johnson | 248—21 |

JOHN PETO, *Primary Examiner.*

U.S. Cl. X.R.

248—358; 267—1